United States Patent [19]

Okamura

[11] 4,339,564
[45] Jul. 13, 1982

[54] HEAT CURABLE ORGANOPOLYSILOXANE COMPOSITIONS
[75] Inventor: Yoshio Okamura, Annaka, Japan
[73] Assignee: Shin-Etsu Chemical Co., Ltd., Tokyo, Japan
[21] Appl. No.: 190,039
[22] Filed: Sep. 23, 1980
[30] Foreign Application Priority Data Sep. 29, 1979 [JP] Japan ................................ 54-126049

[51] Int. Cl.³ ............................................. C08G 77/06
[52] U.S. Cl. ....................................... 528/15; 528/24; 528/31; 528/32; 528/43
[58] Field of Search ....................... 528/15, 24, 31, 32, 528/43

[56] References Cited
U.S. PATENT DOCUMENTS 3,159,601 12/1964 Ashby ................................... 528/15
3,159,662 12/1964 Ashby ................................... 528/15
3,220,972 11/1965 Lamoreaux ........................... 528/31
4,234,713 11/1980 Le Grow .............................. 528/15

Primary Examiner—Melvyn I. Marquis
Attorney, Agent, or Firm—Toren, McGeady & Stanger

[57] ABSTRACT

The invention provides a novel heat curable organopolysiloxane composition capable of giving a cured product having a remarkably high hardness and excellent anti-crack resistance. The cured product is also free from surface tackiness even by heat-curing in air. The main component of the composition is an organopolysiloxane having vinyl groups, phenyl groups and silicon-bonded hydrogen atoms simultaneously in a molecule or a mixture thereof with a second organopolysiloxane having vinyl groups and phenyl groups but no silicon-bonded hydrogen atoms in the molecule. It is essential that the molar ratios of the vinyl groups, phenyl groups, silicon-bonded hydrogen atoms and, if any, alkyl groups in the organopolysiloxane or organopolysiloxanes to the silicon atoms must be within specifically defined ranges and the organopolysiloxane component is admixed with a platinum catalyst for the addition reaction between the vinyl groups and the silicon-bonded hydrogen atoms as well as an organic peroxide such as dicumyl peroxide.

4 Claims, No Drawings

HEAT CURABLE ORGANOPOLYSILOXANE COMPOSITIONS

BACKGROUND OF THE INVENTION

The present invention relates to a heat curable organopolysiloxane composition or, more particularly, to a heat curable organopolysiloxane composition capable of giving a cured product having no surface tackiness and a high hardness and being excellent in anti-crack resistance, heat resistance and electric properties.

As is well known, there have been known several types of heat curable organopolysiloxane compositions. For example, heat curable organopolysiloxane compositions comprising an organopolysiloxane having, in a molecule, vinyl groups, phenyl groups and methyl groups directly bonded to the silicon atoms and an organic peroxide are disclosed in Japanese Patent Publications 31-9394, 34-1288 and 36-11444.

One of the defective points in the heat curable compositions of the above described type is the surface tackiness of the cured product when the composition is cured by heating in air due to the inhibiting influence of the atmospheric oxygen on the curing in the surface layer causing various troubles in the practical use of the composition. Therefore, the use of such a curable composition is limited only to the applications where curing can be carried out with exclusion of atmosphere air unless certain special curing means are undertaken or the surface having tackiness is subjected to a secondary treatment to remove the tackiness.

In order to overcome the above described disadvantage, there has been proposed a method in which the composition is admixed with an organic diluent having unsaturated linkages to improve the curing of the composition in the surface layer. See, for example, Japanese Patent Publication 53-11320. Use of such an organic diluent is not always recommendable because the otherwise excellent heat resistance of the cured silicone products is greatly decreased by the addition thereof along with other disadvantages in the coloration and lowering of electric properties, in particular, at an elevated temperature.

On the other hand, a heat curable organopolysiloxane composition of another type utilizes the crosslink formation by the addition reaction between vinyl groups of a vinyl-containing organopolysiloxane and hydrogen atoms directly bonded to the silicon atoms in an organohydrogenpolysiloxane taking place in the presence of a platinum catalyst to give a cured product. Curable compositions of this type are described, for example, in Japanese Patent Publications 34-990, 38-26771, 48-34382, 52-39658, 52-44900 and 53-21027.

Curable compositions of this type, however, can hardly give a cured product having high mechanical strengths and electrical properties, in particular, at an elevated temperature. This difficulty is partly overcome when large part of the organopolysiloxane constituent is a resinous organopolysiloxane composed mainly of trifunctional siloxane units in its molecular structure. Such a composition usually has a high viscosity so that the workability is poor unless it is used as diluted with an organic solvent. For example, when such a composition is used for impregnation or molding, troubles are sometimes made in the formation of voids or entrainment of air due to the poor fluidity of the composition. Decreasing of the trifunctional siloxane units to obtain lower viscosity and, in compensation therefor, increasing the content of functional groups to increase the crosslinking density and to obtain a cured product having the same degree of hardness as those obtained from the above described compositions necessarily lead to an inferior anti-crack resistance of the cured product which is readily cracked by a mechanical shock or a thermal shock.

Among the problems in the above described heat curable organopolysiloxane composition of the addition reaction type between vinyl groups and silicon-bonded hydrogen atoms in the presence of a platinum catalyst, the largest is the balance between the viscosity of the composition and the mechanical strengths or anti-crack resistance of the cured products thereof. The attempt hitherto undertaken for decreasing the viscosity of the composition and improving the properties of the cured products is to admix a low molecular weight cross-linking agent or a polymerizable diluent with the composition. This attempt has been not always successful because of the complexness of the manufacturing process and the expensiveness of the adjuvant materials leading to an increased production cost as well as the inferior electric properties at an elevated temperature or increased volatile matter after heating of the cured products due to the addition of the low molecular compounds.

SUMMARY OF THE INVENTION

It is therefore an object of the present invention to provide a novel and improved heat curable organopolysiloxane composition free from the above described prior art curable compositions and capable of giving a cured product having high hardness but no surface tackiness even by curing in air and also having excellent anti-crack resistance, heat resistance and electric properties.

The heat curable organopolysiloxane composition of the present invention comprises (a) an organopolysiloxane having, in a molecule, each at least one vinyl group, phenyl group, hydrogen atom directly bonded to the silicon atom and, optionally an alkyl group or a mixture thereof with a second organopolysiloxane having, in a molecule, each at least one vinyl group and phenyl group but no hydrogen atoms directly bonded to the silicon atoms, of which the molar ratios of the vinyl groups, phenyl groups, hydrogen atoms directly bonded to the silicon atoms and alkyl groups to the silicon atoms satisfy following relations:

vinyl groups/silicon atoms=0.15 to 0.4;
phenyl groups/silicon atoms=0.4 to 1.1;
silicon-bonded hydrogen atoms/silicon atoms=0.1 to 0.4;
alkyl groups/silicon atoms=0 to 1.65; and
(vinyl groups/silicon atoms)+(phenyl groups/silicon atoms)+(silicon-bonded hydrogen atoms/silicon atoms)+(alkyl groups/silicon atoms)=1.5 to 2.3, (b) a catalyst for the addition reaction between vinyl groups and silicon-bonded hydrogen atoms in the component (a), and (c) an organic peroxide.

DETAILED DESCRIPTION OF THE PREFERRED EMBODIMENTS

The component (a) as the main ingredient of the inventive heat curable composition is an organopolysiloxane of a single type or a mixture of organopolysiloxanes of two different types. When this component (a) is composed of a single kind of an organopolysiloxane, it is essential that the organopolysiloxane has simultaneously at least one vinyl group, phenyl group, silicon-bonded hydrogen atom and, optionally, alkyl group bonded to the silicon atoms in a molecule. It is essential that the molar ratios of the vinyl groups, phenyl groups, silicon-bonded hydrogen atoms and alkyl groups to the silicon atoms in this organopolysiloxane satisfy the following relations:

vinyl groups/silicon atoms = 0.15 to 0.4;
phenyl groups/silicon atoms = 0.4 to 1.1;
silicon-bonded hydrogen atoms/silicon atoms = 0.1 to 0.4; and
alkyl groups/silicon atoms = 0 to 1.65, and the summation of the above four ratio values is in the range from 1.5 to 2.3.

The above mentioned alkyl group is exemplified by methyl, ethyl, propyl and butyl groups, among which methyl group is the most preferred.

As is mentioned above, the component (a) may be a mixture of two kinds of organopolysiloxanes which satisfies, as a whole mixture, the above given molar relationships among the vinyl groups, phenyl groups, silicon-bonded hydrogen atoms and, optionally, alkyl groups to the silicon atoms. In this case, one of the organopolysiloxane must have simultaneously at least one vinyl group, phenyl group, silicon-bonded hydrogen atom and, optionally, alkyl group although this first organopolysiloxane alone may not satisfy the above given molar relationships. Instead, the compliance of the component (a) as a whole with the molar relationships is obtained by admixing a second organopolysiloxane having, simultaneously in a molecule, at least one vinyl group, phenyl group and, optionally, alkyl group but having no hydrogen atoms directly bonded to the silicon atoms.

If either one of the organopolysiloxanes does not contain at least one vinyl group, phenyl group and silicon-bonded hydrogen atom simultaneously in a molecule, the object of the present invention cannot be achieved even though the above given molar relationships are satisfied by admixing the second organopolysiloxane. For example, it is possible to obtain an organopolysiloxane mixture which satisfy the above molar relationships among the vinyl groups, phenyl groups, silicon-bonded hydrogen atoms and alkyl, e.g. methyl, groups to the silicon atoms by mixing a first organopolysiloxane having at least one vinyl group, phenyl group and methyl group bonded simultaneously to the silicon atoms in a molecule and a second organopolysiloxane having at least one phenyl group, methyl group and silicon-bonded hydrogen atom bonded simultaneously to the silicon atoms in a molecule. When such a mixture of two organopolysiloxanes is used as the main ingredient in a heat curable organopolysiloxane composition by admixing a catalyst for addition reaction and an organic peroxide, the cured products obtained therefrom have low hardness and poor anti-crack resistance although there may be no problem in the absence of surface tackiness.

When the ratio of vinyl groups/silicon atoms is smaller than 0.15 in the component (a), regardless of whether it is a single kind of an organopolysiloxane or a mixture of two kinds of organopolysiloxanes, the organopolysiloxane composition formulated therewith has no satisfactory curability even by admixing of sufficient amounts of the catalyst and the organic peroxide whereas the value larger than 0.4 leads to a cured product having poor flexibility and inferior anti-crack resistance.

When the ratio of phenyl groups/silicon atoms is smaller than 0.4, the curable composition formulated with the component (a) exhibits increased shrinkage in curing by heating and the resultant cured products have poor flexibility and inferior anti-crack resistance whereas the value larger than 1.1 leads to a smaller velocity of curing of the composition and increase in heat softening of the cured products.

The summation of the molar ratios (vinyl groups/silicon atoms) + (phenyl groups/silicon atoms) + (silicon-bonded hydrogen atoms/silicon atoms) + (alkyl groups/silicon atoms) is also of significance and a value smaller than 1.5 results in a cured product having poor flexibility while a value larger than 2.3 cannot give a composition having satisfactory curability.

The viscosity of the component (a) is not particularly limitative but, when the composition of the present invention is used in molding by casting or in impregnation, it is preferable that the viscosity of the component (a) is relatively low or, for example, 100,000 centipoise or below. In this case, the organopolysiloxane or organopolysiloxanes as the component (a) desirably have a linear molecular structure composed of difunctional siloxane units such as dimethyl siloxane units, diphenyl siloxane units, methylphenyl siloxane units, vinylmethylsiloxane units and methylhydrogensiloxane units terminated at the molecular chain ends with monofunctional siloxane units such as trimethylsiloxane units, vinyldimethylsiloxane units and dimethylhydrogensiloxane units.

The component (a) having the above mentioned linear chain molecular structure and satisfying the above described limitations can give, even though with a relatively low viscosity, cured product having no surface tackiness and sufficiently high hardness and exhibiting no cracks on the surface when admixed with the undermentioned components (b) and (c) and subjected to curing by heating.

The organopolysiloxane or organopolysiloxanes to be used as the component (a) in the inventive composition can be prepared by several known methods. For example, the organopolysiloxane having at least one vinyl group, phenyl group, alkyl group and hydrogen atom directly bonded to the silicon atoms in a molecule may be synthesized by the following procedure.

Thus, a mixture of low molecular organopolysiloxanes, i.e. an octaorganocyclotetrasiloxane expressed by the formula

and a hexaorganodisiloxane expressed by the formula $R_3SiOSiR_3$, where R denotes an organic group selected from vinyl, phenyl and alkyl groups, is admixed with a catalytic amount of sodium or potassium hydroxide and heated under agitation at a temperature of 120° C. or higher to be copolymerized followed by neutralization with acetic acid or ethylenechlorohydrine. Stripping of the thus obtained reaction mixture under reduced pressure and heating and removal of the precipitated salt give an organopolysiloxane having vinyl, phenyl and alkyl groups bonded to the silicon atoms.

Alternatively, this organopolysiloxane is obtained starting with a mixture of corresponding hydrolyzable or hydroxy-containing organosilanes. Thus, a mixture of organosilanes expressed by the formulas $R_3SiX$ and $R_2SiX_2$, where R has the same meaning as described above and X is a hydrolyzable group such as an alkoxy group and acyloxy group or a hydroxy group, is cohydrolyzed in an excess volume of water followed by washing with water, drying and polymerizing at an elevated temperature with admixture of an alkaline catalyst such as sodium or potassium hydroxide.

The above obtained organopolysiloxane is them admixed with a predetermined amount of an organohydrogenpolysiloxane having hydrogen atoms directly bonded to the silicon atoms such as 1,1,3,3-tetramethyldisiloxane, 1,3,5,7-tetramethylcyclotetrasiloxane or a linear methylhydrogenpolysiloxane terminated at both chain ends with trimethylsily groups together with a catalytic amount of a strong acid such as concentrated sulfuric acid, fuming sulfuric acid and trifluoromethanesulfonic acid and these polysiloxanes are copolymerized with agitation. Neutralization of the reaction mixture with sodium carbonate or sodium hydrogencarbonate or washing with water to neutral of the reaction mixture followed by drying and stripping to remove volatile low molecular compounds at an elevated temperature gives the desired organopolysiloxane having at least one vinyl group, phenyl group, alkyl group and hydrogen atom directly bonded to the silicon atoms.

It should be noted that the use of an alkaline catalyst in the above described polymerization is not recommended because the bond between the silicon atom and the hydrogen atom is susceptible to scission by a strong alkali. Further, even an acid catalyst used for the polymerization may cause scission of the Si—H linkages depending on the conditions of the polymerization so that the amount of an acid catalyst should be limited as low as possible or, say, to 5% by weight or less based on the total amount of the reactants and the reaction temperature should be not exceeding 30° C. Of course, the reaction velocity is unduly decreased or the viscosity of the reaction mixture is increased when the temperature is excessively low so that the lower limit of the reaction temperature cannot be below $-20°$ C.

When it is not essential that the viscosity of the component (a) is particularly low, trifunctional siloxane units expressed by the formula $R'SiO_{1.5}$, where $R'$ denotes a hydrogen atom, alkyl group, vinyl group or phenyl group, may be used as the constituents of the component (a). When the content of the trifunctional units is large, however, the organopolysiloxane naturally cannot have a substantially linear chain structure. In such a case, the hydrolysis may be carried out in an excess volume of water with a mixture of the organopolysiloxane obtained as described above with one or more of organosiloxane compounds having hydrolyzable atoms or groups, optionally, diluted with an organic solvent such as hydrocarbon solvents, alcoholic solvents, ketone solvents and ester solvents.

After the hydrolysis in the above manner, the polymerization is undertaken in the presence of an acid catalyst followed by washing with water, filtration and stripping under reduced pressure to give the desired organopolysiloxane having a substantially linear chain molecular structure.

The above described organopolysiloxane having considerable amounts of trifunctional siloxane units is sometimes highly viscous or solid but it can be used as blended with or dissolved in another low-viscous organopolysiloxane having a linear chain molecular structure. It is of course that even such a solid organopolysiloxane may be used as such in some applications such as a molding compound or a powdery paint vehicle.

Depending on the conditions of preparation, the organopolysiloxanes as prepared may contain considerable amounts of silanolic hydroxy groups or alkoxy groups but they have no particularly adverse effects on the essential properties of the inventive compositions.

Further, inclusion of tetrafunctional siloxane units $SiO_2$ is undesirable in the above described organopolysiloxane having vinyl groups, phenyl groups, alkyl groups and silicon-bonded hydrogen atoms due to the decrease in the anti-crack resistance of the cured products although presence of small amounts of $SiO_2$ units is not particularly detrimental.

The component (b) as the catalyst for the addition reaction may be a known one conventionally used in the reaction of hydrosilation. Several of the examples are chloroplatinic acid alcohol-modified chloroplatinic acid (see U.S. Pat. No. 3,220,972), complexes of chloroplatinic acid with olefins (see U.S. Pat. Nos. 3,159,601 and 3,159,662) and platinum black as well as those solid platinum catalysts supported on a carrier such as alumina and silica. Chloroplatinic acid and olefin complexes thereof are used desirably as dissolved in an organic solvent such as alcoholic solvents, ketone solvents, ether solvents, hydrocarbon solvents and the like while the solid platinum catalysts are desirably divided as finely as possible or prepared with a carrier having a fine particle diameter and large specific surface area in order that the solid catalyst may have a large effective surface area.

The amount of the component (b) in the inventive composition is not particularly limitative and determined according to the desired velocity of curing. As a measure from the standpoint of economy or obtaining a satisfactorily cured state, the amount of the component (b) in the composition is in the range from 1 to 50 p.p.m. for those catalysts soluble in the organopolysiloxanes such as chloroplatinic acid and from 200 to 500 p.p.m. for the solid catalysts such as platinum black based on the amount of the component (a).

The organic peroxide as the component (c) used in the inventive composition may be any one of those conventionally formulated in silicone rubber compositions such as benzoyl peroxide, dicumyl peroxide, di-tert-butyl peroxide and the like. The amount of the component (c) in the inventive composition is preferably in the range from 0.1 to 3 parts by weight per 100 parts by weight of the component (a).

It is essential in the present invention that both of the components (b) and (c) are formulated in combination. When the component (a) alone is heated, substantially no curing reaction takes place or, if ever it takes place, prolonged heating at a considerably high temperature is necessary to obtain a practical degree of curing.

Further, cured products having a sufficient hardness are in general hardly obtained with the component (a) admixed with the component (b) alone and an attempt to increase the hardness of the cured products by increasing the proportion of the trifunctional siloxane units in the component (a) or by increasing the overall content of the functional groups is unsuccessful due to the problem of decreased anti-crack resistance. On the other hand, a composition composed of the components (a) and (c) with exclusion of the component (b) is not sufficiently cured in the surface layer. For example, prolonged heating of the composition of the components (a) and (c) at a temperature of 200° C. or higher is still insufficient when complete removal of surface tackiness is desired. When the amount of the organic peroxide as the component (c) is excessively increased, there may take place a phenomenon of foaming of the cured products due to the decomposition gases produced from the peroxide.

Curing of the inventive composition prepared by uniformly blending the components (a), (b) and (c) is carried out by merely heating the composition at a temperature of 100° C. or higher or, preferably, in the range from 150° to 200° C.

In the preparation of the inventive composition, the order of blending the individual components is not particularly limitative. For example, however, when the component (a) is a mixture of the above described two types of organopolysiloxanes, it is preferable that a catalyst solution is prepared in advance by dissolving necessary amounts of the components (b) and (c) in a small amount of the organopolysiloxane having vinyl groups and phenyl groups but no hydrogen atoms directly bonded to the silicon atoms and this catalyst solution is taken and blended directly before use with the remaining portion of the above organopolysiloxane and all of the other organopolysiloxane.

The pot life of the inventive composition can be extended by formulating a retarder of the catalyst for addition reaction such as an acetylenic compound, amine compound and sulfonyl compound and sufficient stabilization of the composition gives a possibility of a one-package type formulation of the curable composition. In particular, the use of the retarder is effective when the composition is used in an application of casting or impregnation where the composition is heated in advance to have a decreased viscosity in order to avoid an inconvenience of premature initiation of the curing reaction still on the way of works before heating and curing.

The curable composition of the present invention may be used as such without any organic solvents but it is of course optional to use it as diluted with an organic solvent such as hydrocarbon solvents, e.g. toluene, xylene and the like, ester solvents, ether solvents and the like having miscibility with the components of the composition. Proper selection of the organic solvent is of some significance because the presence of a large amount of alcoholic hydroxy groups in the solvent is detrimental for obtaining the desired properties of the cured products due to the possible reaction between the hydroxy groups and the silicon-bonded hydrogen atoms in the presence of the catalyst for addition reaction.

The curable composition of the present invention may be formulated with a filler when further improvement is desired in the mechanical strengths, anti-crack resistance and electric properties as well as flame retardancy of the cured products obtained therefrom along with the decrease of the costs of the composition. Various kinds of filler materials are named as suitable for the purpose including fumed silica filler, powdered quartz, glass fibers, carbon black, iron oxides, titanium dioxide, talc, clay, bentonite, mica powder and the like.

Addition of a small amount of a non-functional or low-functional organopolysiloxane is also effective for improving the anti-heat shock resistance, flexibility and the like of the cured products obtained from the inventive composition. Further, pigments, dyes and, according to need, dilatancy-imparting agents may be used in combination.

Application of the inventive curable composition extends to a variety of fields including, for example, coating of electronic instruments for moisture-proofing, heat protection and electric insulation, potting of electric and electronic devices, surface treatment of glass cloth, glass-woven sleeves and the like, binding of glass cloth laminates, molding of articles, binding of FRPs by a filament winding or hand lay-up method, binding of silicone ceramics, admixing into paints and the like.

In the following, the present invention is described in further detail by way of examples, in which the preparation of the organopolysiloxanes is first described. Among the organopolysiloxanes described below, each of the organopolysiloxanes V-I to V-III is an organopolysiloxane having, in a molecule, vinyl groups, phenyl groups and methyl groups bonded to the silicon atoms but no silicon-bonded hydrogen atoms and each of the organopolysiloxanes H-I to H-VII is an organopolysiloxane having, in a molecule, vinyl groups, phenyl groups, methyl groups and hydrogen atoms directly bonded to the silicon atoms. In the following, parts are all given by parts by weight.

Preparation of Organopolysiloxane V-I

Into a mixture composed of 291 g (0.36 mole) of octaphenylcyclotetrasiloxane, 64.4 g (0.21 mole) of octamethylcyclotetrasiloxane, 108 g (0.31 mole) of 1,3,5,7-tetramethyl-1,3,5,7-tetravinyl cyclotetrasiloxane and 32.4 g (0.30 mole) of hexamethyldisiloxane was added 0.22 g of powdered potassium hydroxide and the mixture was heated with agitation for 20 hours at 140° C. under an atmosphere of nitrogen. After cooling to 70° C. or below, 1.2 g of acetic acid was added to the mixture which was further agitated for additional 2 hours at 60° to 70° C. Stripping of the mixture to remove volatile low molecular components under conditions of a temperature of 140° C. and a pressure of 3 mmHg followed by cooling to room temperature and filtration gave 449 g of clear, light yellow liquid having a viscosity of 1100 centipoise at 25° C. This product is called organopolysiloxane V-I. The content of vinyl groups in this organopolysiloxane V-I was 0.24 mole/100 g as determined by NMR analysis.

Preparation of Organopolysiloxane H-I

Into 200 g of the organopolysiloxane V-I obtained above were admixed 30.4 g of 1,3,5,7-tetramethylcyclotetrasiloxane and, after cooling to 0° C. or below, 3.5 g of the concentrated sulfuric acid were added to the mixture which was agitated for 20 hours at 0° C.

Thereafter, the mixture was neutralized by adding 12 g of sodium hydrogencarbonate in small portions followed by agitation at room temperature for 2 hours. Thus neutralized mixture was then filtered and subjected to stripping under conditions of a temperature of 140° C. and a pressure of 3 mmHg to remove volatile low molecular compounds. The product weighing 210 g was a clear, colorless liquid having a viscosity of 820 centipoise at 25° C. This product is called organopolysiloxane H-I. The contents of vynil groups and silicon-bonded hydrogen atoms in this organopolysiloxane H-I were 0.20 mole/100 g and 0.20 mole/100 g, respectively, the latter being determined by the hydrogen was evolution with addition of a 20% aqueous solution of sodium hydroxide and n-butyl alcohol.

Preparation of Organopolysiloxane V-II

A mixture of organochlorosilanes composed of 61.9 g (0.48 mole) of dimethyldichlorosilane, 344 g (1.36 mole) of diphenyldichlorosilane, 135 g (0.96 mole) of vinylmethyldichlorosilane and 48.3 g (0.40 mole) of vinyldimethylchlorosilane was added dropwise into 500 ml of water at 18° C. with agitation. The temperature of mixture increased to 60° C. at the end of addition of the silane mixture. Agitation was further continued for 2 hours at 70° C. and the hydrolyzate was separated from the aqueous layer, washed with water, dehydrated with anhydrous sodium sulfate and filtered.

The thus obtained hydrolyzate was admixed with 0.18 g of powdered potassium hydroxide and gradually heated with agitation under an atmosphere of nitrogen. Condensation water distilled out was discarded and the distillate of low molecular organopolysiloxane was returned to the mixture under heating. After about 3 hours from the beginning, the condensation water was no longer distilled out of the reaction mixture which was thereafter further agitated for additional 15 hours at 140° C. After cooling to 70° C., the reaction mixture was neutralized by the addition of 1.0 g of acetic acid followed by agitation for 2 hours at 60° to 70° C. Stripping of the reaction mixture under conditions of a temperature of 140° C. and a pressure of 3 mmHg followed by cooling to room temperature and filtration gave 375 g of a clear, light yellow liquid product having a viscosity of 2010 centipoise at 25° C. This product is called organopolysiloxane V-II. The content of vinyl groups in this organopolysiloxane V-II was 0.32 mole/100 g.

Preparation of Organopolysiloxane H-II

The procedure was about the same as in the preparation of the organopolysiloxane H-I except that the amount of the 1,3,5,7-tetramethylcyclotetrasiloxane was increased to 100 g instead of 30.4 g and the amount of the concentrated sulfuric acid was increased to 4.5 g. A clear, colorless liquid product weighing 264 g was obtained having a viscosity of 420 centipoise at 25° C. This product is called organopolysiloxane H-II. The contents of vinyl groups and silicon-bonded hydrogen atoms in this organopolysiloxane H-II were 0.16 mole/100 g and 0.50 mole/100 g, respectively.

Preparation of Organopolysiloxane H-III

A mixture of 200 g of the organopolysiloxane V-II and 28.3 g of 1,3,5,7-tetramethylcyclotetrasiloxane was cooled to 0° C. or below and admixed with 6.8 g of concentrated sulfuric acid followed by agitation for 20 hours at 0° C. The mixture was diluted with 114 g of toluene, washed with water to neutral, dehydrated with anhydrous sodium sulfate, filtered and subjected to stripping under conditions of a temperature of 140° C. and a pressure of 3 mmHg to give 201 g of a clear, colorless liquid product having a viscosity of 1720 centipoise at 25° C. This product is called organopolysiloxane H-III. The contents of vinyl groups and silicon-bonded hydrogen atoms in this organopolysiloxane H-III were 0.25 mole/100 g and 0.18 mole/100 g, respectively.

Preparation of Organopolysiloxane V-III

The procedure was about the same as in the preparation of the organopolysiloxane V-II except that the mixture of the organochlorosilanes was composed of 42.3 g (0.20 mole) of phenyltrichlorosilane, 304 g (1.2 moles) of diphenyldichlorosilane, 77.5 g (0.60 mole) of dimethyldichlorosilane, 72.4 g (0.60 mole) of vinyldimethylchlorosilane and 84.6 g (0.60 mole) of vinylmethyldichlorosilane and 380 g of a clear, colorless liquid product having a viscosity of 2440 centipoise at 25° C. were obtained. This product is called organopolysiloxane V-III. The content of vinyl groups in this organopolysiloxane V-III was 0.27 mole/100 g.

Preparation of Organopolysiloxane H-IV

The procedure was about the same as in the preparation of the organopolysiloxane H-III except that the organopolysiloxane V-II was replaced with the same amount of the organopolysiloxane V-III and the amount of the 1,3,5,7-tetramethylcyclotetrasiloxane was 25.0 g instead of 28.3 g and 200 g of a clear, colorless liquid product having a viscosity of 1810 centipoise at 25° C. were obtained. This product is called organopolysiloxane H-IV. The contents of vinyl groups and silicon-bonded hydrogen atoms in this organopolysiloxane H-IV were 0.22 mole/100 g. and 0.17 mole/100 g, respectively.

Preparation of Organopolysiloxane H-V

A mixture of organochlorosilanes composed of 423 g (2.0 moles) of phenyltrichlorosilane, 113 g (0.8 mole) of vinylmethyldichlorosilane and 155 g (1.2 moles) of dimethyldichlorosilane diluted with 420 g of toluene was added dropwise into 1000 ml of hot water at 50° C. with agitation to be hydrolyzed. The reaction vessel was cooled from outside to compensate for the heat evolution by the reaction and to keep the reaction mixture at 60° to 70° C. After completion of the addition of the silane mixture, the reaction mixture was agitated for further 2 hours at 70° C., cooled, washed with water to neutral, dehydrated with anhydrous sodium sulfate and filtered.

The thus obtained hydrolyzate was admixed with 400 g of the organopolysiloxane H-I and the mixture was subjected to stripping under conditions of a temperature of 120° C. and a pressure of 10 mmHg to give 808 g of a clear, colorless liquid product having a viscosity of 7500 centipoise at 25° C. This product is called organopolysiloxane H-V. The contents of vinyl groups and silicon-bonded hydrogen atoms in this organopolysiloxane H-V were 0.17 mole/100 g and 0.093 mole/100 g, respectively and it was expressed by the following unit formula:

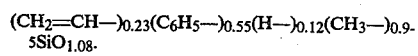

$(CH_2=CH-)_{0.23}(C_6H_5-)_{0.55}(H-)_{0.12}(CH_3-)_{0.95}SiO_{1.08}.$

Preparation of Organopolysiloxane H-VI

A silane mixture composed of 370 g (1.75 mole) of phenyltrichlorosilane, 127 g (0.50 mole) of diphenyldichlorosilane, 141 g (1.0 mole) of vinylmethyldichlorisilane and 64.5 g (0.50 mole) of dimethyldichlorosilane diluted with 480 g of toluene was gradually added dropwise into a mixture of 360 g of acetone and 1500 g of water under control to keep the temperature of the reaction mixture at 20° C. or below to effect cohydrolysis of the silanes. After completion of the addition of the silane mixture, the mixture was further agitated for 30 minutes at 20° C. followed by liquid-liquid phase separation into the organopolysiloxane layer of the hydrolyzate and the aqueous layer. The aqueous solution was discarded.

The above obtained hydrolyzate was admixed with 84 g of 1,1,3,3-tetramethyldisiloxane and 75 g of concentrated hydrochloric acid and agitated for 20 hours at 10° to 20° C. followed by washing with water to neutral, dehydration with anhydrous sodium sulfate and filtered and thereafter further admixed with 440 g of the organopolysiloxane V-I. This mixture of organopolysiloxanes was subjected to stripping under conditions of a temperature of 120° C. and a pressure of 10 mmHg and filtered to give an organopolysiloxane having a viscosity of 3410 centipoise at 25° C. The contents of vinyl groups and silicon-bonded hydrogen atoms in this organopolysiloxane were 0.22 mole/100 g and 0.11 mole/100 g, respectively. This organopolysiloxane is called oraganopolysiloxane H-VI and is expressed by the following unit formula:

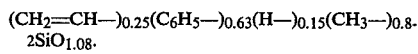

$(CH_2=CH-)_{0.25}(C_6H_5-)_{0.63}(H-)_{0.15}(CH_3-)_{0.8-2}SiO_{1.08}.$

Preparation of Organopolysiloxane H-VII

A mixture of organopolysiloxane composed of 291 g of octaphenylcyclotetrasiloxane, 157 g of octamethylcyclotetrasiloxane and 32.4 g of hexamethyldisiloxane was admixed with 0.22 g of powdered potassium hydroxide and treated in the same manner as in the preparation of the organopolysiloxane V-I to give 442 g of a clear, colorless liquid product. Treatment of a mixture composed of 200 g the above obtained liquid product and 60.6 g of 1,3,5,7-tetramethylcyclotetrasiloxane in the same manner as in the preparation of the organopolysiloxane H-I gave 240 g of a clear, colorless liquid product having a viscosity of 815 centipoise at 25° C. This product is called organopolysiloxane H-VII. The content of silicon-bonded hydrogen atoms in this organopolysiloxane H-VII was 0.38 mole/100 g.

Preparation of Organopolysiloxane H-VIII

Into a mixture of organopolysiloxanes composed of 173 g of octamethylcyclotetrasiloxane, 126 g of 1,3,5,7-tetramethyl-1,3,5,7-tetravinylcyclotetrasiloxane, 63.6 g of 1,3,5,7-tetramethylcyclotetrasiloxane and 32.4 g of hexamethyldisiloxane were added 6.0 g of fulfuric acid dropwise under agitation and the mixture was agitated for additional 10 hours at room temperature followed by neutralization with sodium hydrogen-carbonate, filtration and stripping under conditions of a temperature of 140° C. and a pressure of 10 mmHg to give an organopolysiloxane having a viscosity of 30 centipoise at 25° C. This product is called organopolysiloxane H-VIII. This organopolysiloxane contained 0.36 mole/100 g and 0.26 mole/100 g of vinyl groups and silicon-bonded hydrogen atoms, respectively, but contained no phenyl groups. This organopolysiloxane was poorly miscible with either one of the organopolysiloxanes V-I to V-III and H-I to H-VII.

EXAMPLE 1

(Experiments No. 1 to No. 5).

Into 100 parts of the organopolysiloxane V-I, H-I or a mixture thereof was added a solution of chloroplatinic acid modified with n-butyl alcohol (hereinafter this solution is called Pt-BuOH) in an amount of 20 p.p.m. by weight as platinum and uniformly blended followed by defoaming to give a heat curable organopolysiloxane composition. This composition was heated and converted into cured product which examined for the surface condition, hardness and occurrence of cracks on the surface. The results are set out in Table 1 below together with the molar ratios of vinyl groups to silicon atoms (Vi/Si), phenyl groups to silicon atoms (Ph/Si), silicon-bonded hydrogen atoms to silicon atoms (H/Si) and methyl groups to silicon atoms (Me/Si) as well as summation of these ratios. The curing schedule and the testing methods were as follows.

Hardness: The above prepared heat curable organopolysiloxane composition was taken in an aluminum dish of an inner diameter of 60 mm and a depth of 10 mm and heated first at 150° C. for 6 hours and then 200° C. for 2 hours. The thus cured body was allowed to stand at 25° C. for 24 hours and the hardness of the cured body in Shore D scale was determined.

Occurrence of cracks; A spring washer of No.2, type 10 as specified in JIS B 1251 was placed on the bottom of the same aluminum dish as used in the above at the center thereof and 20 g of the heat curable composition was poured thereover and cured in the same schedule as above. After cooling to room temperature, occurrence of cracks traversing the surface of the cured body was visually examined.

Electric properties of the cured product were examined with the composition prepared in Experiment No. 1 above which was cured under the same curing schedule as described above, i.e. first at 150° C. for 6 hours and then at 200° C. for 2 hours, and tested in accordance with the testing methods specified in JIS C 2122. The results are set out in Table 2 below. The test pieces used for the measurements of the volume resistivity and the dielectric breakdown were prepared in a thickness of 0.34 to 0.36 mm and the test pieces used for the measurements of the dielectric constant and the dielectric tangent were each shaped in a rectangular piece of 30×100×2.5 mm.

When the test pieces above prepared were kept in a high temperature atmosphere at 250° C. for 15 days, weight decrease of them was only 5.2% by weight with no changes in the appearance showing excellent heat resistance.

EXAMPLE 2

(Experiments No. 6 to No. 11)

Heat curable organopolysiloxane compositions were prepared each by blending 100 parts of the organopolysiloxane H-II or a mixture thereof with the organopolysiloxane V-I in a proportion as indicated in Table 3 below with 1.0 part of dicumyl peroxide and Pt-BuOH in an amount of 20 p.p.m. as platinum. The results of the curing test carried out in the same manner as in Example 1 are set out in Table 3 together with the molar ratios of the individual groups to silicon atoms in each of the organopolysiloxanes or mixtures thereof.

EXAMPLE 3

(Experiments No. 12 to No. 15)

Heat curable organopolysiloxane compositions were prepared each by blending 100 parts of the organopolysiloxane V-II, organopolysiloxane H-III or a mixture thereof in a proportion indicated in Table 4 below with 1.0 part of 2,5-dimethyl-2,5-bis(tert-butylperoxy)hexane and Pt-BuOH in an amount of 20 p.p.m. as platinum. The results of the curing test are set out in Table 4 together with the molar ratio of the individual groups to the silicon atoms in each of the organopolysiloxanes or mixtures thereof.

EXAMPLE 4

(Experiments No. 16 to No. 19)

Heat curable organopolysiloxane compositions were prepared each by blending 100 parts of the organopolysiloxane V-III, organopolysiloxane H-IV or a mixture thereof in a proportion indicated in Table 5 below with 1.0 part of dicumyl peroxide and Pt-BuOH in an amount of 20 p.p.m. as platinum. The results of the curing test are set out in Table 5 together with the molar ratios of the individual groups to the silicon atoms in each of the organopolysiloxanes or mixtures thereof.

EXAMPLE 5

(Experiments No. 20 and No. 21)

Heat curable organopolysiloxane compositions were prepared each by blending 100 parts of the organopolysiloxane H-V (Experiment No. 20) or the organopolysiloxane H-VI (Experiment No. 21) with 1.0 part of dicumyl peroxide and Pt-BuOH in an amount of 20 p.p.m. as platinum. The results of the curing test carried out in the same manner as in Example 1 were quite as satisfactory as in Experiment No. 1.

EXAMPLE 6

(Experiment No. 22)

A paste-like heat curable organopolysiloxane composition was prepared by uniformly blending 45 parts of the organopolysiloxane V-I, 55 parts of the organopolysiloxane H-I, 2.5 parts of dicumyl peroxide, Pt-BuOH in an amount of 20 p.p.m. as platinum and 100 parts of finely pulverized fused quartz using a three-roller mill.

The above prepared pasty composition was shaped by use of a transfer molding machine with a metal mold for the test pieces for flexural strength measurement. The temperature of the metal mold was 190° C. and the molding time was 10 minutes. The thus obtained molded pieces had satisfactory appearance and a flexural strength of 5.3 kg/mm². Further, the molded pieces retained a flexural strength of 4.8 kg/mm² even after aging of 4 days in a high temperature atmosphere at 250° C.

EXAMPLE 7

(Experiments No. 23 to No. 30)

Heat curable organopolysiloxane compositions were prepared each by blending 100 parts of the organopolysiloxane V-I, organopolysiloxane H-I or a mixture thereof in a proportion indicated in Table 6 below with either dicumyl peroxide or Pt-BuOH in an amount indicated in Table 6. The results of the curing test undertaken in the same manner as in Example 1 are set out in Table 6.

EXAMPLE 8

(Experiments No. 31 to No. 35)

Heat curable organopolysiloxane compositions were prepared each by blending 100 parts of a mixture of the organopolysiloxane V-I and the organopolysiloxane H-VII in a proportion indicated in Table 7 below with 1.0 part of dicumyl peroxide and Pt-BuOH in an amount of 20 p.p.m. as platinum. The results of the curing test undertaken in the same manner are set out in Table 7 together with the molar ratios of the individual groups to the silicon atoms in each of the organopolysiloxane mixtures.

EXAMPLE 9

(Experiment No. 36)

A heat curable organopolysiloxane was prepared by blending 100 parts of the organopolysiloxane H-VIII with 1.0 part of dicumyl peroxide and Pt-BuOH in an amount of 20 p.p.m. as platinum. This composition was cured by heating first at 150° C. for 6 hours and then at 200° C. for 2 hours. The cured product had no surface tackiness but the hardness of it was as low as 7 in the Shore D scale. Further, the test for the anti-crack resistance undertaken in the same manner as in Example 1 indicated that cracks were formed on the surface of the cured product even without the use of a spring washer used in Example 1.

TABLE 1

| Experiment No. | Organopolysiloxane V-I, parts | H-I, parts | H/Vi | Vi/Si (= a) | Ph/Si (= b) | H/Si (= c) | Me/Si (= d) | a + b + c + d | Surface condition | Hardness | Cracks on the surface |
|---|---|---|---|---|---|---|---|---|---|---|---|
| 1 | 45 | 55 | 0.5 | 0.27 | 0.64 | 0.14 | 1.04 | 2.09 | No tackiness | 64 | No |
| 2 | 26 | 74 | 0.7 | 0.26 | 0.60 | 0.18 | 1.04 | 2.08 | No tackiness | 67 | No |
| 3 | 0 | 100 | 1.0 | 0.24 | 0.56 | 0.24 | 1.04 | 2.08 | No tackiness | 68 | No |
| 4 | 100 | 0 | 0 | 0.32 | 0.74 | 0 | 1.05 | 2.10 | Uncured | 64 | Yes |
| 5 | 66 | 34 | 0.3 | 0.29 | 0.67 | 0.09 | 1.05 | 2.09 | Slightly tacky | 65 | No |

TABLE 2

| | | As cured at 25° C. | As cured at 180° C. | After dipping in water |
|---|---|---|---|---|
| Volume resistivity, ohm-cm | | $5.5 \times 10^{16}$ | $1.1 \times 10^{14}$ | $4.2 \times 10^{16}$ |
| Dielectric breakdown, kV/minute | | 52 | 49 | 50 |
| Dielectric constant | 50 Hz | 3.59 | 3.54 | — |
| | 100 kHz | 3.62 | — | — |
| | 1 MHz | 3.59 | — | — |
| Dielectric tangent (tan δ) | 50 Hz | 0.002 | 0.014 | — |
| | 100 kHz | 0.005 | — | — |
| | 1 MHz | 0.004 | — | — |

TABLE 3

| Experiment No. | Organopolysiloxane V-I, parts | H-II, parts | H/Vi | Vi/Si (= a) | Ph/Si (= b) | H/Si (= c) | Me/Si (= d) | a + b + c + d | Surface condition | Hardness | Cracks on the surface |
|---|---|---|---|---|---|---|---|---|---|---|---|
| 6 | 78 | 22 | 0.5 | 0.27 | 0.64 | 0.14 | 1.04 | 2.09 | No tackiness | 67 | No |
| 7 | 70 | 30 | 0.7 | 0.26 | 0.60 | 0.18 | 1.04 | 2.08 | No tackiness | 68 | No |
| 8 | 59 | 41 | 1.0 | 0.24 | 0.56 | 0.24 | 1.04 | 2.08 | No tackiness | 70 | No |

TABLE 3-continued

| Experiment No. | Organopolysiloxane V-I, parts | Organopolysiloxane H-II, parts | Molar ratio H/Vi | Vi/Si (= a) | Ph/Si (= b) | H/Si (= c) | Me/Si (= d) | a + b + c + d | Cured product Surface condition | Hardness | Cracks on the surface |
|---|---|---|---|---|---|---|---|---|---|---|---|
| 9 | 27 | 73 | 2.0 | 0.19 | 0.45 | 0.39 | 1.03 | 2.06 | No tackiness | 64 | No |
| 10 | 86 | 14 | 0.3 | 0.29 | 0.67 | 0.09 | 1.05 | 2.09 | Slightly tacky | 67 | Yes |
| 11 | 0 | 100 | 3.13 | 0.16 | 0.37 | 0.42 | 1.03 | 2.05 | No tackiness | 54 | No |

TABLE 4

| Experiment No. | Organopolysiloxane V-II, parts | Organopolysiloxane H-III, parts | Molar ratio H/Vi | Vi/Si (= a) | Ph/Si (= b) | H/Si (= c) | Me/Si (= d) | a + b + c + d | Cured product Surface condition | Hardness | Cracks on the surface |
|---|---|---|---|---|---|---|---|---|---|---|---|
| 12 | 52 | 48 | 0.3 | 0.38 | 0.75 | 0.11 | 0.87 | 2.11 | No tackiness | 70 | No |
| 13 | 26 | 74 | 0.5 | 0.35 | 0.70 | 0.18 | 0.88 | 2.10 | No tackiness | 71 | No |
| 14 | 0 | 100 | 0.72 | 0.33 | 0.65 | 0.23 | 0.89 | 2.10 | No tackiness | 73 | No |
| 15 | 100 | 0 | 0 | 0.43 | 0.85 | 0 | 0.85 | 2.13 | Uncured | 66 | Yes |

TABLE 5

| Experiment No. | Organopolysiloxane V-III, parts | Organopolysiloxane H-IV, parts | Molar ratio H/Vi | Vi/Si (= a) | Ph/Si (= b) | H/Si (= c) | Me/Si (= d) | a + b + c + d | Cured product Surface condition | Hardness | Cracks on the surface |
|---|---|---|---|---|---|---|---|---|---|---|---|
| 16 | 56 | 44 | 0.3 | 0.34 | 0.73 | 0.10 | 0.74 | 2.11 | No tackiness | 55 | No |
| 17 | 31 | 69 | 0.5 | 0.35 | 0.70 | 0.18 | 0.88 | 2.10 | No tackiness | 63 | No |
| 18 | 0 | 100 | 0.72 | 0.32 | 0.65 | 0.23 | 0.89 | 2.10 | No tackiness | 63 | No |
| 19 | 100 | 0 | 0 | 0.38 | 0.81 | 0 | 0.94 | 2.13 | Uncured | 42 | Yes |

TABLE 6

| Experiment No. | Organopolysiloxane V-I, parts | Organopolysiloxane H-I, parts | Dicumyl peroxide, parts | Pt—BuOH, p.p.m. as Pt | Cured product Surface condition | Hardness | Cracks on the surface |
|---|---|---|---|---|---|---|---|
| 23 | 45 | 55 | 1.0 | 0 | Uncured | 59 | No |
| 24 | 45 | 55 | 2.0 | 0 | Uncured | 79 | Yes |
| 25 | 45 | 55 | 0 | 20 | No tackiness | 24 | Yes |
| 26 | 45 | 55 | 0 | 40 | No tackiness | 26 | Yes |
| 27 | 100 | 0 | 1.5 | 0 | Uncured | 72 | No |
| 28 | 100 | 0 | 0 | 20 | Absolutely no curing | | |
| 29 | 0 | 100 | 1.5 | 0 | Uncured | 63 | Yes |
| 30 | 0 | 100 | 0 | 20 | No tackiness | 38 | Yes |

TABLE 7

| Experiment No. | Organopolysiloxane V-I, parts | Organopolysiloxane H-VII, parts | Molar ratio H/Vi | Vi/Si (= a) | Ph/Si (= b) | H/Si (= c) | Me/Si (= d) | a + b + c + d | Cured product Surface condition | Hardness | Cracks on the surface |
|---|---|---|---|---|---|---|---|---|---|---|---|
| 31 | 84 | 16 | 0.3 | 0.25 | 0.68 | 0.076 | 1.09 | 2.09 | Uncured | <5 | Yes |
| 32 | 76 | 24 | 0.5 | 0.22 | 0.63 | 0.11 | 1.10 | 2.07 | Tacky | 16 | Yes |
| 33 | 69 | 31 | 0.7 | 0.20 | 0.60 | 0.14 | 1.12 | 2.06 | No tackiness | 28 | Yes |
| 34 | 61 | 39 | 1.0 | 0.17 | 0.57 | 0.17 | 1.13 | 2.05 | No tackiness | 35 | Yes |
| 35 | 51 | 49 | 1.5 | 0.14 | 0.54 | 0.21 | 1.15 | 2.04 | No tackiness | 32 | Yes |

What is claimed is:

1. A heat curable organopolysiloxane composition which comprises (a) an organopolysiloxane having, in a molecule, each at least one vinyl group, phenyl group and hydrogen atom directly bonded to silicon atoms or a mixture thereof with a second organopolysiloxane having, in a molecule, each at least one vinyl group and phenyl group but having no hydrogen atoms directly bonded to the silicon atoms where each of the organopolysiloxanes may have at least one alkyl group in a molecule and the molar ratios of the vinyl groups, phenyl groups, hydrogen atoms directly bonded to the silicon atoms and, if any, alkyl groups to the silicon atoms satisfy the following relations:

vinyl groups/silicon atoms = 0.15 to 0.4;
phenyl groups/silicon atoms = 0.4 to 1.1;
silicon-bonded hydrogen atoms/silicon atoms = 0.1 to 0.4;
alkyl groups/silicon atoms = 0 to 1.65; and
(vinyl groups/silicon atoms) + (phenyl groups/silicon atoms) + (silicon-bonded hydrogen atoms/silicon atoms) + (alkyl groups/silicon atoms) = 1.5 to 2.3,
(b) a catalyst for the addition reaction between the vinyl groups and the silicon-bonded hydrogen atoms in the component (a), and (c) an organic peroxide.

2. The heat curable organopolysiloxane composition as claimed in claim 1 wherein the catalyst as the component (b) is chloroplatinic acid.

3. The heat curable organopolysiloxane composition as claimed in claim 1 wherein the organic peroxide is dicumyl peroxide.

4. The heat curable organopolysiloxane composition as claimed in claim 1 wherein the amount of the organic peroxide as the component (c) is in the range from 0.1 to 3 parts by weight per 100 parts by weight of the component (a).

* * * * *